Oct. 24, 1933.  P. LAMBERTUS ET AL  1,931,662
INSECT EXTERMINATOR
Filed Sept. 15, 1932
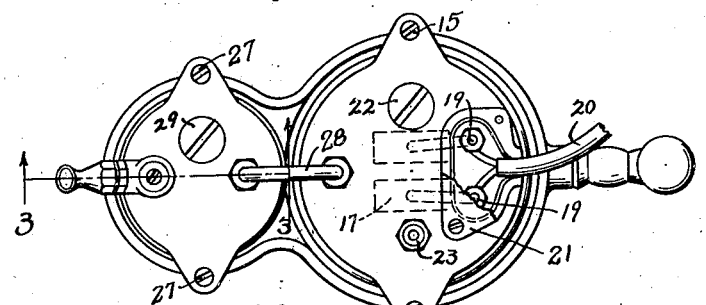
Fig. 1.
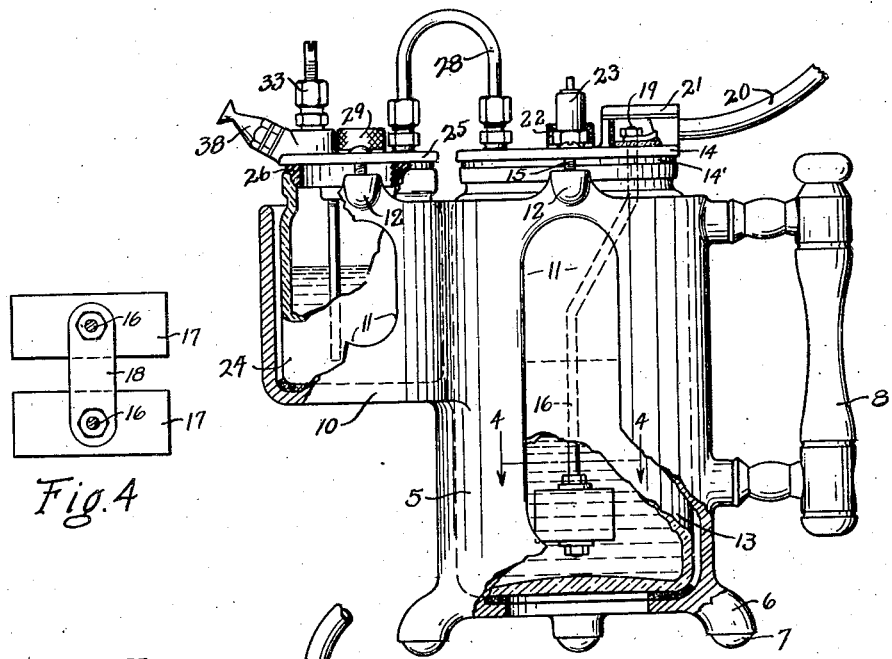
Fig. 4
Fig. 2
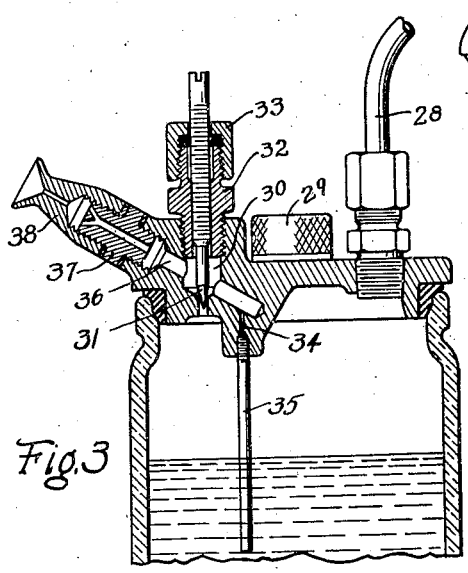
Fig. 3
Inventors.
Peter Lambertus,
Emmett H. Trimpe and
Kenneth G. Kountz
By Minturn & Minturn
Attorneys.

Patented Oct. 24, 1933

1,931,662

UNITED STATES PATENT OFFICE 1,931,662

INSECT EXTERMINATOR

Peter Lambertus, Emmett H. Trimpe and Kenneth G. Kountz, Indianapolis, Ind., assignors to Acme Sales Corp., Indianapolis, Ind., a corporation of Indiana Application September 15, 1932
Serial No. 633,327

4 Claims. (Cl. 299—87)

The object of this invention is to provide a hand-portable device for producing a spray for the extermination of noxious insects and particularly such as infest hotels, apartments and other dwelling houses.

Another object is to utilize steam pressure for atomizing a poisonous liquid and for discharging the atoms with a regulated force into corners, cracks and other vermin infested places.

A further object is to generate the steam by means of an electrode energized by current from the house service wires.

We accomplish the above and other objects which will hereinafter appear by the means illustrated in the accompanying drawing, in which—

Fig. 1 is a top plan view of our invention;

Fig. 2 is a side elevation of same broken away in part;

Fig. 3 is a vertical section of the top part of the small jar on the line 3—3 of Fig. 1, and Fig. 4 is a horizontal section on the line 4—4 of Fig. 2, showing the electrodes in top plan view.

Like characters of reference indicate like parts in the several views of the drawing.

A housing comprising a main body portion 5 has legs 6, here shown as four in number, each equipped with a rubber bumper 7 to avoid injury to any finished surface upon which the body may be deposited. The body is preferably formed of metal for durability, and aluminum to reduce the weight. The body has a handle 8 for convenient manual transportation and use.

The body 5 has a hollow extension 10 and both members 5 and 10 have sight openings 11 on two diametrically opposite sides for visual examination of their contents. They are also provided with outwardly projecting lugs 12, here shown as one above each of the sight openings, and each lug has a threaded hole entering from the top for the attachment of jar covers as will be described in the following paragraph.

Seated in the hollow body 5 is a glass jar 13, with a reduced neck extending above the body and closed by a metal lid or cover 14. The lid has perforated ears through which screws 15 are passed into threaded engagement with corresponding lugs 12. A suitable gasket 14' is interposed between the cover 14 and jar top and an air and water tight fit of the cover on the jar is obtained by tightening the screws 15.

Depending from the cover 14 are two rods 16, each of which suspends an electrode 17. The two electrodes are spaced apart by a plate of insulation 18. The upper ends of the rods are threaded to form electrical terminals 19, insulated from the cover 14, which are connected with a source of current through wires in the cord 20. The terminals 19 are preferably contained in a housing extension of the cover which housing has its own cover 21, as shown in Fig. 2.

The jar 13 is partially filled with water (containing a slight amount of mineral as is found in the average city water) which is generated into steam by the electrodes when the current is on. The water is introduced through an opening in the cover which is normally closed by a screw cap 22. A safety valve 23 supported by the cover prevents explosion from too high steam pressure in the jar 13.

Seated in the extension 10 is a small glass jar 24, which has a metal cover 25 sealed by a gasket 26 and retained by screws 27 entering the threaded holes in corresponding lugs 12. Steam generated in the jar 13 is delivered to the top of jar 24 through the cover 25 through a communicating pipe 28.

The jar 24 is partially filled with a liquid insecticide of any suitable and desired composition, through an opening in the cover 25 which is normally closed by a screw cap 29. Formed in the cover 25 is a chamber 30 which has a reduced inlet from the jar 24 for the passage of steam to the chamber. The size of this steam inlet to chamber 30 is regulated by a needle valve 31 the threaded stem of which screws in a plug 32 closing the top of the chamber. The size of the opening into the chamber is regulated by screwing the threaded stem in or out of the plug and leakage around the stem is prevented by a cap 33 and suitable packing as shown.

The chamber 30 is also entered by a passage 34, which communicates with a pipe 35 that depends from the cover 25 to near the bottom of the jar 24, as shown in Fig. 2. Steam pressure above the liquid insecticide in the jar will force some of the liquid through pipe 35, into the chamber 30 where it will be vaporized by the steam coming through the entrance controlled by the needle valve.

Discharge of the resulting vapors is through a discharge opening 36 into a nozzle extension of novel form comprising a male member 37 and a female extension member 38. The male member screws into a suitably threaded opening in the cover communicating with the opening 36 from the chamber 30 and the female extension member screws on the threaded end of the member 37. The discharge passage through member 37 is bifurcated at its outer portion and discharges into an enlargement of the bore of the member 38 which serves as a mixing chamber and the discharge thereto through the plural passages formed by the bifurcation in 37 causes an eddy or movement which more thoroughly mixes the insecticide vapors with the steam.

The inner and major portion of the discharge opening through the member 38 is reduced and small but at the end of the member the outlet is funnel shaped to prevent the collection of vapors into drops which we have discovered will obtain if the nozzle were cut straight across.

In the operation of our device, the jar 13 is suitably supplied with water and closed, and the jar 24 is supplied with a liquid insecticide. Then the current is turned on to the electrodes by turning a switch, (not shown) in the circuit, and when the steam pressure has sufficiently developed a vapor of mixed steam and insecticide will be discharged from the nozzle member 38. The device is readily portable by manually lifting it by the handle 8. The discharge nozzle being directly opposite the handle and elevated as shown in Fig. 2, is well positioned to be directed to places where the insecticide is most required.

The proportion of insecticide vapor to steam may be regulated by the adjustment of the needle valve 31. By opening the valve 31 a greater amount of steam is introduced into the mixture. Where we are required to kill insects toward the upper parts of walls or ceilings or crevices therein a large amount of steam is desired because it is lighter than the air and will rise against the ceiling and penetrate the crevices. By partially closing the valve a heavier vapor mixture will be obtained which will settle into crevices near the floor.

The handle 8 is made of wood or other non-conductor of electricity so that in case of a short circuit of the current to the electrodes into the housing the person holding the handle 8 will be insulated. This is an important feature of our construction.

Another important safeguard is in the attachment of the covers 14 and 25 to the lugs 12 of the metal housing instead of to their respective glass jars. The metal parts will withstand approximately twice the pressure or strain as the glass jars with the result that should the jars break from excessive steam pressure or other cause, as for example by a failure of the safety valve 23 to function, the electrodes and parts generally will be retained in working assembly and no serious damage will be done, as might be if the covers were attached instead to the glass jars themselves.

While we have illustrated and described the best embodiment of our invention now known to us we are aware that many changes are possible in details and arrangement and we therefore do not desire to be limited any more than is required by the appended claims.

We claim:

1. A glass receptacle containing a liquid insecticide, a second glass receptacle containing water, a metal body containing both glass receptacles, a metal lid for each receptacle attached to the body, electrical means for heating the water to generate steam attached to the lid of the water receptacle, pipe communication between the metal lids of the two receptacles, a chamber in the insecticide receptacle lid having a discharge outlet, a pipe terminating in the insecticide liquid and discharging into the chamber, an inlet discharging steam into the chamber, a needle valve control for the steam inlet, said body having a handle for manually carrying the device as a whole, said handle being a non-conductor of electricity.

2. A metal body having two compartments, a glass jar for each compartment one of which contains water and the other a liquid insecticide, means for heating the water to generate steam in its jar, a metal cover for each jar, means for securing the covers to the body and drawing them toward their respective jars, means for discharging steam from the jar containing water to the jar containing insecticide and means for atomizing the insecticide with the steam and for discharging the resulting vapors to atmosphere.

3. In an insect exterminator, a pair of glass jars, one of which contains an insecticide and the other contains water, a body of less breakable material than glass containing both of the jars, means for heating the water to generate steam in the water containing jar, a cover for each jar of less breakable material than glass, means for securing the covers to the body and drawing them toward their respective jars, means for discharging steam from the jar containing water to the jar containing insecticide and means for atomizing the insecticide with the steam and for discharging the resulting vapors to atmosphere.

4. A body member having a handle on one side and a hollow extension on the other, a closed glass jar seated in the body and in the extension, the jar in the body containing water and the jar in the extension containing a liquid insecticide, both of said jars being closed, a pipe communication between the upper portions of the two jars, electric means for heating the water to generate steam; a chamber, a pipe terminating in the insecticide liquid and discharging into the chamber, a vapor inlet from the first receptacle discharging into the chamber, a needle valve control for the vapor inlet and a nozzle discharge from the chamber.

PETER LAMBERTUS.
EMMETT H. TRIMPE.
KENNETH G. KOUNTZ.